US005213350A

United States Patent [19]

Hermanson

[11] Patent Number: 5,213,350

[45] Date of Patent: May 25, 1993

[54] MECHANIC'S CREEPER TRUCK

[76] Inventor: John Hermanson, P.O. Box 325, Newhall, Calif. 91322

[21] Appl. No.: 786,741

[22] Filed: Nov. 1, 1991

[51] Int. Cl.[5] ........................ B25H 5/00; B62B 11/00

[52] U.S. Cl. ................................................ 280/32.6

[58] Field of Search .................... 280/32.6, 32.5, 79.7, 280/62, 87.01, 87.021

[56] References Cited

U.S. PATENT DOCUMENTS 2,684,734 7/1954 Wilson .......................... 280/32.6 X
4,792,147 12/1988 Wissing ............................ 280/32.6
4,875,694 10/1989 Hamrick ........................... 280/32.6
5,108,118 4/1992 Schaevitz .......................... 280/32.6

FOREIGN PATENT DOCUMENTS 2250332 5/1975 France .............................. 280/32.6

*Primary Examiner*—Margaret A. Focarino
*Assistant Examiner*—Kevin Hurley
*Attorney, Agent, or Firm*—Lawrence S. Cohen

[57] ABSTRACT

A creeper for use by mechanics and inspectors has a platform for supporting the user and a pair of roller elements astride the user's head at one end and roller element between the user's legs at the other end. The single roller element is in a mounting system which supports the creeper a preselected distance above ground on a spring biasing system which can be overcome by increasing the weight on the platform near the system so that the platform will lower into contact with the floor.

15 Claims, 4 Drawing Sheets

FIG. 1
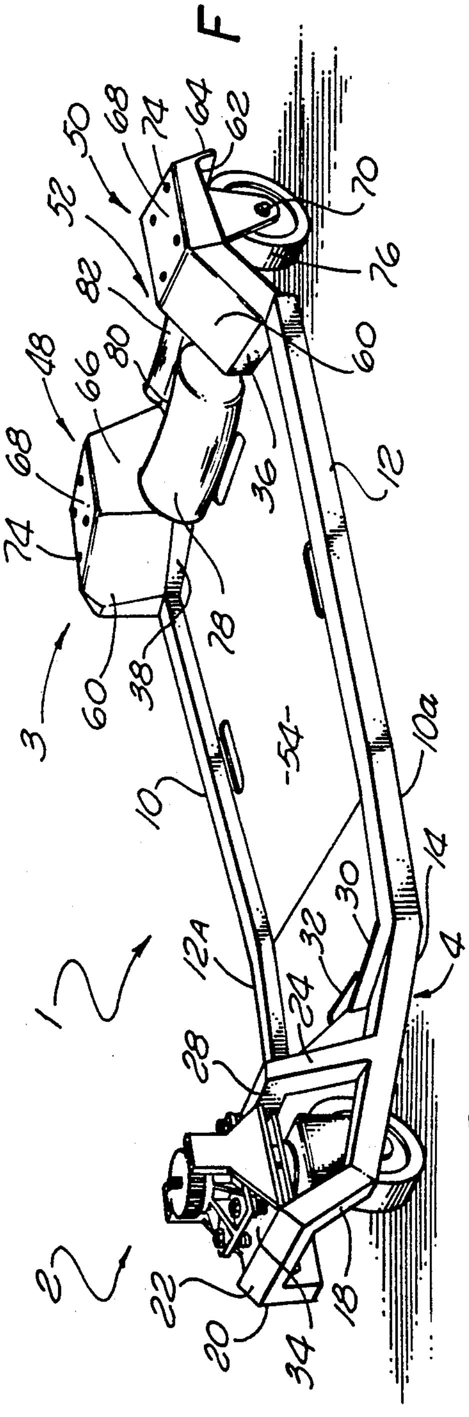
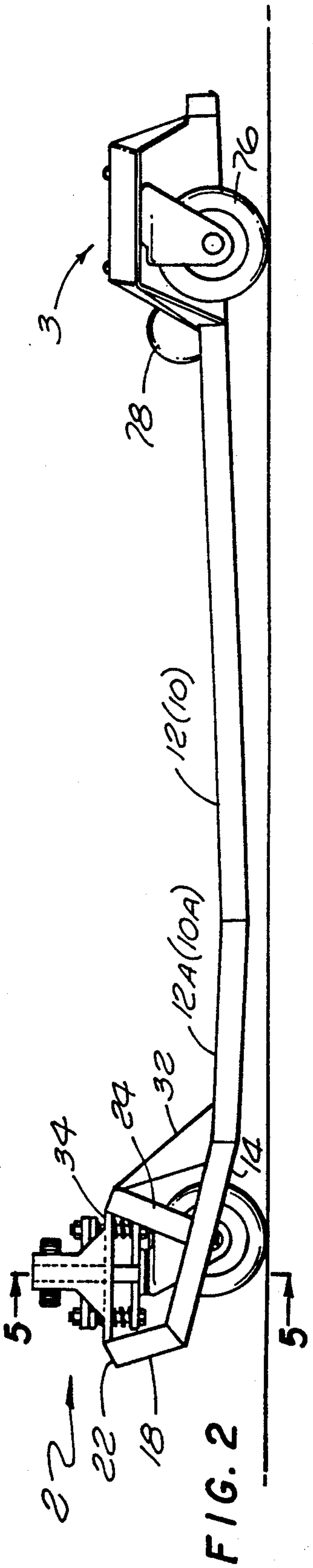
FIG. 2
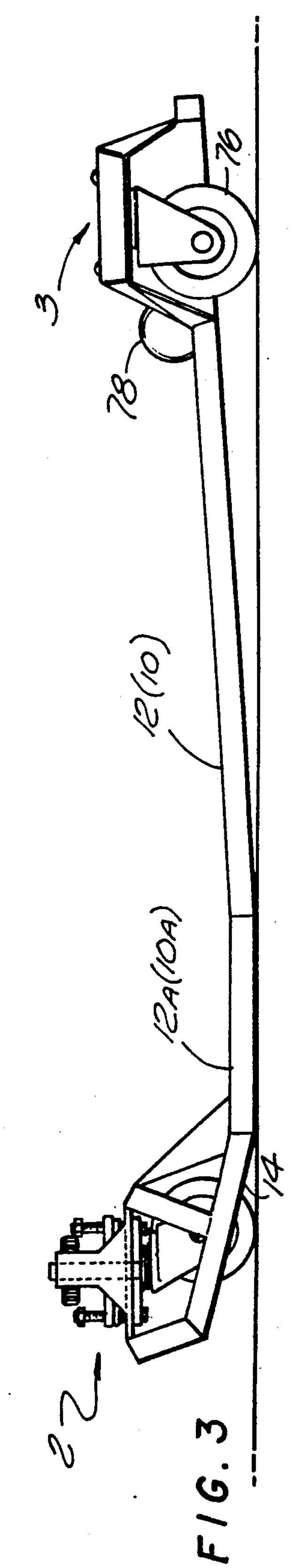
FIG. 3

MECHANIC'S CREEPER TRUCK

BACKGROUND OF THE INVENTION

This invention relates to creepers for use by mechanics and inspectors.

Creepers of the prior art include the following:

U.S. Pat. No. 4,875,694 shows a low bed type creeper where four casters are located in fender spaces two along a longitudinal axis and two along a transverse axis. Ground engagement is by tilting the shoulder area to touch the ground by flexibility of the platform.

U.S. Pat. No.2,246,628 shows a creeper with casters mounted on a leaf spring which will overcome the weight of a user, but under overload such as by a vehicle, will flex so that it will retract when weighted by 150 lbs to allow pendant cross members to hit the floor, thereby preventing damage to the creeper.

U.S. Pat. No. 4,244,594 shows a creeper having a flap structure which can bend under the weight of the user to act as a brake against the ground.

U.S. Pat. No. 4,792,147 is a molded body creeper which uses large caster wheels mounted by fenders higher than lower portions of the body. Four wheels are disclosed, and use three wheels is mentioned.

U.S. Pat. No. 1,831,408 shows a creeper having two caster wheels installed along a longitudinal axis, allowing tilting to left or right to place a lateral retaining arm in contact with the ground.

U.S. Pat. No. 1,531,536 has laterally disposed valves to one side of a midpoint which allows one end to rise and fall from the floor.

French Patent No. 2,250,332 shows a three wheeled trolley, two near the upper torso and one between the legs.

U.S. Pat. No. 2,291,094 four has wheel wells, two of which are adjacent and outbound of the users shoulders.

U.K. Patent No. 732,274 is a three wheel creeper with laterally disposed anchoring blocks near the users' shoulders.

SUMMARY OF THE INVENTION

The creeper has a narrow platform which can be as narrow as the shoulders of a user. At a head end there is a head support portion, preferably padded for supporting the user's head, and a pair of caster pockets one on each side of the head support portion, within the lateral edges of the platform. At a tail end, there is a single centrally located caster. Between the tail end and the head end is a platform on which the user lies, supporting his torso; the hips being located near the tail end, and the tail end caster being between the user's thighs. The platform is mounted on the tail end caster by a mounting assembly which allows a free range of vertical movement of the platform and the platform is upwardly biased to keep the platform off the ground while the user is fully prone with his weight distributed. When the user shifts his weight to his hips, such as by raising his head or shoulders or legs, the biasing resistance is overcome by the increased weight and the platform will lower until it touches the floor. This mechanism is adjustable to accommodate users of different weight.

The three wheeled narrow construction permits use in very narrow areas as well as allowing the taking of sharp turns; for example between the axles of double axle trucks.

With all three casters in rolling position, the creeper can easily be maneuvered into position. The biased tail end mounting assembly will keep the platform in a firm working position in contact with the ground when the user shifts weight such as by raising his shoulders to work on a vehicle.

BRIEF DESCRIPTION OF THE DRAWINGS

FIG. 1 is a perspective view of the preferred embodiment of the invention.

FIG. 2 is a side view of the preferred embodiment of the invention in rolling position with the platform in the raised position.

FIG. 3 is a side view of the preferred embodiment of the invention with the platform in the lowered position.

DETAILED DESCRIPTION

Figure 4:
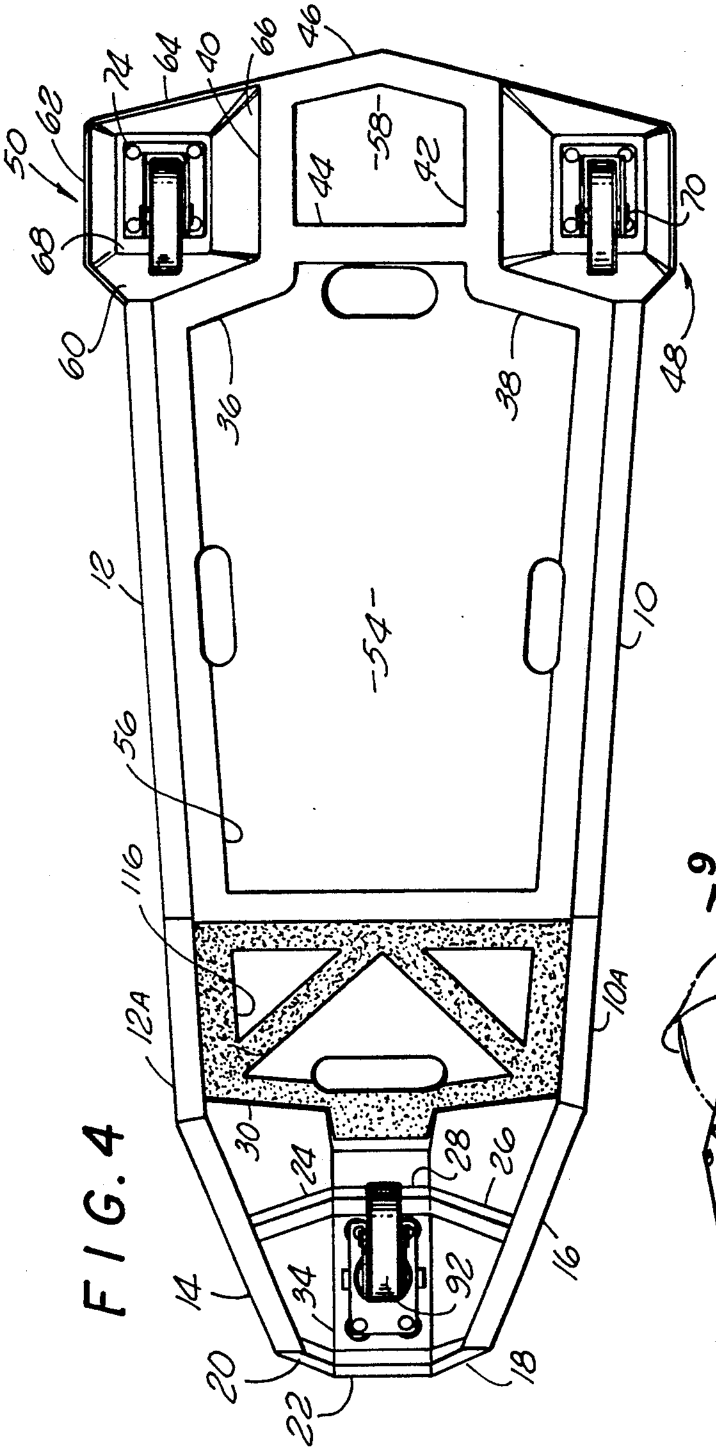
FIG. 4 is a bottom view of the preferred embodiment of the invention.
Figure 9:
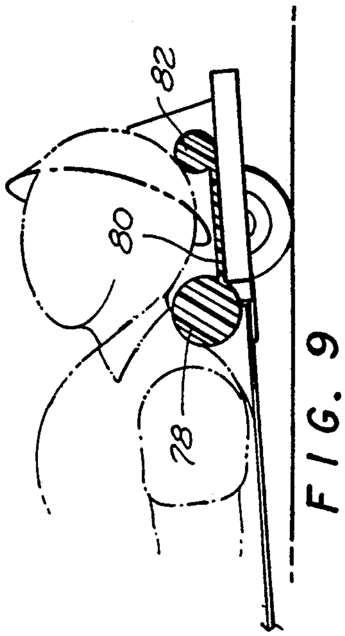
FIG. 9 is a partial side view of the head end showing in phantom lines a user's head in position on the head rest.

FIGS. 1–4 show the overall construction of the creeper. It has a platform 1 having a tail end 2 and a head end 3. The platform 1 has a frame which is constructed as a weldment of hollow aluminum square cross-section structural members. Side members 10 and 12 define the lateral edges of the platform 1. Near the tail end 2, the side members are slightly bent upward as seen at 10*a* and 12*a* respectively.

A cage-like structure 4 is constructed at and forms the tail end 2 by elements 14, 16, 18, 20, 22, 24, 26 and 28. Also a rim 30 and a web 32 provide additional structural support. This cage-like structure 4 supports a platen 34, welded in the front to element 22 and in the rear to element 28.

The head end 3 is formed of structural elements 36, 38, 40, 42, 44 and 46. Also at the head end are castor pockets 48 and 50, and a head rest 52. The rear element 46 forms two angled side 46*a* and 46*b*, which facilitates standing the creeper on end, with a slight tilt and allowing easy rotation on the point 46*c* to place the creeper in position.

A support floor 54 is between the side members 10 and 12 and the rim 30 and the head end structural members 36, 38 and 44. The support floor 54 is attached by a thin strip peripheral frame 56 which is spot welded to the other members. A support piece 58 is fitted inside the space defined by the elements 42, 44 and 46. A series of hand grips 59 are placed on the sides, head end and tail end to facilitate carrying. The side grips are placed to balance the creeper for easy carrying.

The head end castor pockets are constructed of pieces 60, 62, 64 and 66 welded together with a cover 68 to form a downwardly open pocket and attached to the respective adjacent frame elements. In each of the castor pockets 48 and 50 reside castors 70. In this example commercially available casters are used. The casters 70 are bolted to the covers 68 of end castor pocket 48 and 58 by four bolts 74. As seen best in the side view of FIGS. 2 and 3 the caster wheels 76 will extend sufficiently below the lowest part of the head end 3 that the creeper will remain clear of the floor at the head end. The caster pockets 48, and 50 protect the user from injury due to pinching the skin of the arms in the castors or from having long hair caught in the casters.

Most creepers use a small wheel of about 2 inch diameter. In this design the castors are larger, from about 3½ inches to 4 inches. This larger wheel allows easier use, for example in truck inspection and weighing stations, over lights in the floor, debris and bumps and over asphalt.

Figure 8:
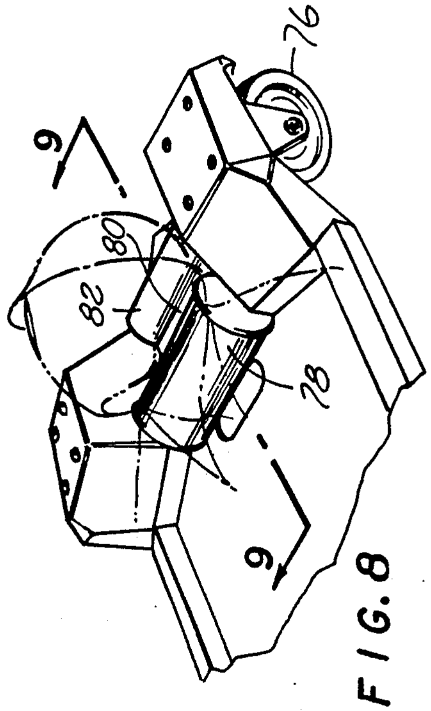
FIG. 8 is a partial perspective view of the head end showing in phantom lines a user's head in position on the head rest.
Figures 6, 7:
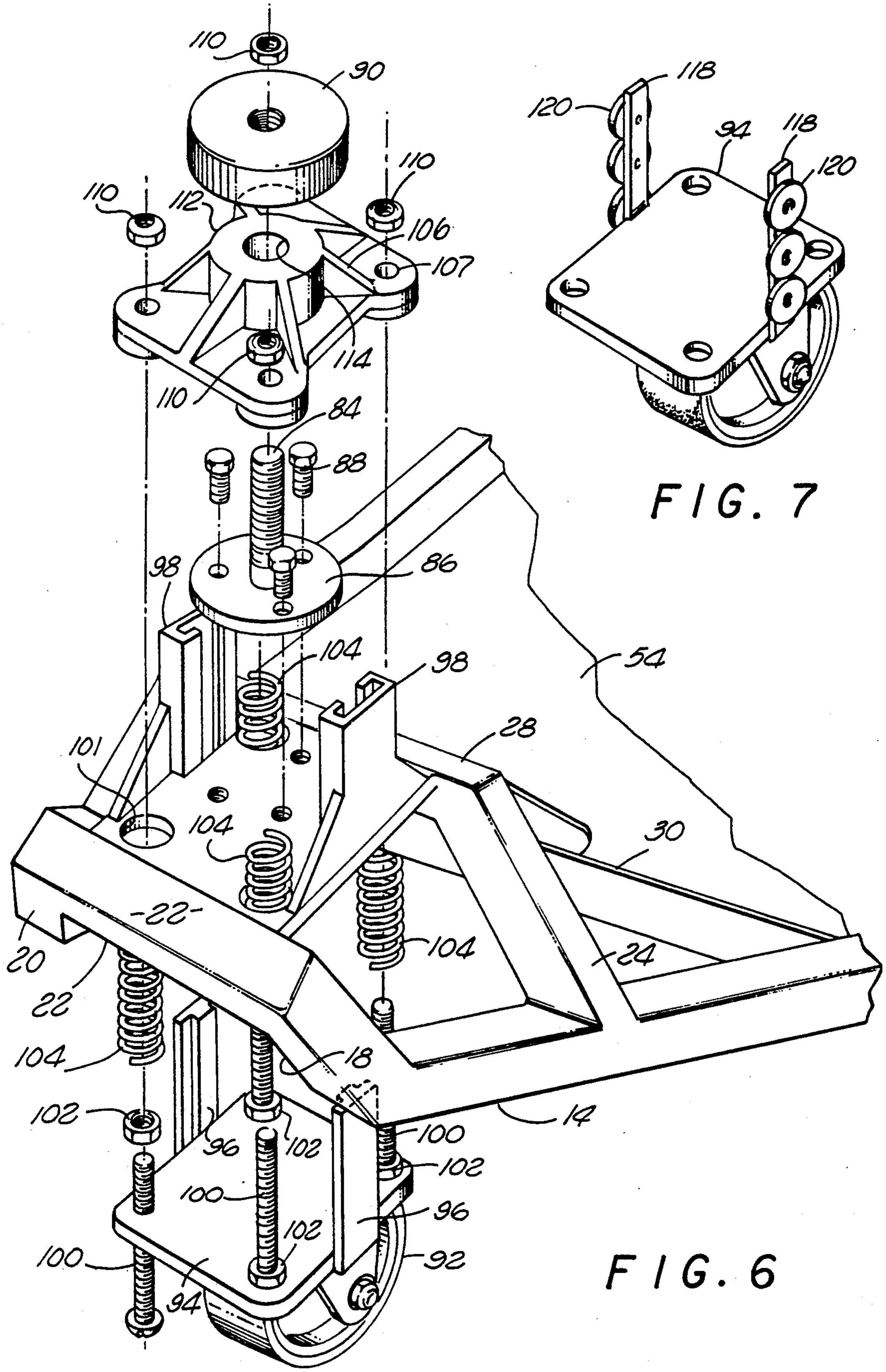
FIG. 6 is a perspective exploded partial view of the tail end portion showing the mounting assembly.
FIG. 7 is a perspective view of an alternative construction of the mounting assembly.

Also at the head end 3 is a head support assembly. The head support is seen in FIGS. 1–3, 7 and 8. The head support assembly is made of leather or plastic padded material. The construction of the head support comprises a neck support roll 78, and flat pad 80 and a rear support roll 82. By this arrangement, when the user is wearing a hard hat, the hard hat will remain in a normal comfortable position on the user's head, as illustrated in FIGS. 7 and 8 because the larger neck support roll 78 and the rear support roll 82 keeps the head raised above the flat pad 80 sufficiently to provide a space for the hard hat and especially for the rim of the hard hat to be free, not in contact with the flat pad 80. The rear support roll 82 keeps the hard hat in position on the user's head.

The tail end construction of the cage-like structure 4 supports the platen 34 which in turn is part of the platform mount system. This is shown in detail in FIGS. 5 and 6. As previously described, the platen 34 is welded to the members 22 and 28 which run laterally across the creeper. At each end of the member 22, are members 18 and 20 respectively which extend at an angle, downwardly to join with members 14 and 16 which in turn join the lateral edge members 10 and 12.

Mounted centrally on the platen 34 is a threaded shaft 84 which at its bottom end is attached to a base 86, the base 86 being screwed to the platen 34 by screws 88. Threaded on the shaft 84 is a pre-load adjusting knob 90. These elements comprise the reactive portion of the platform mount system, so-called because they react to the biasing effect of the biasing portion.

Figure 5:
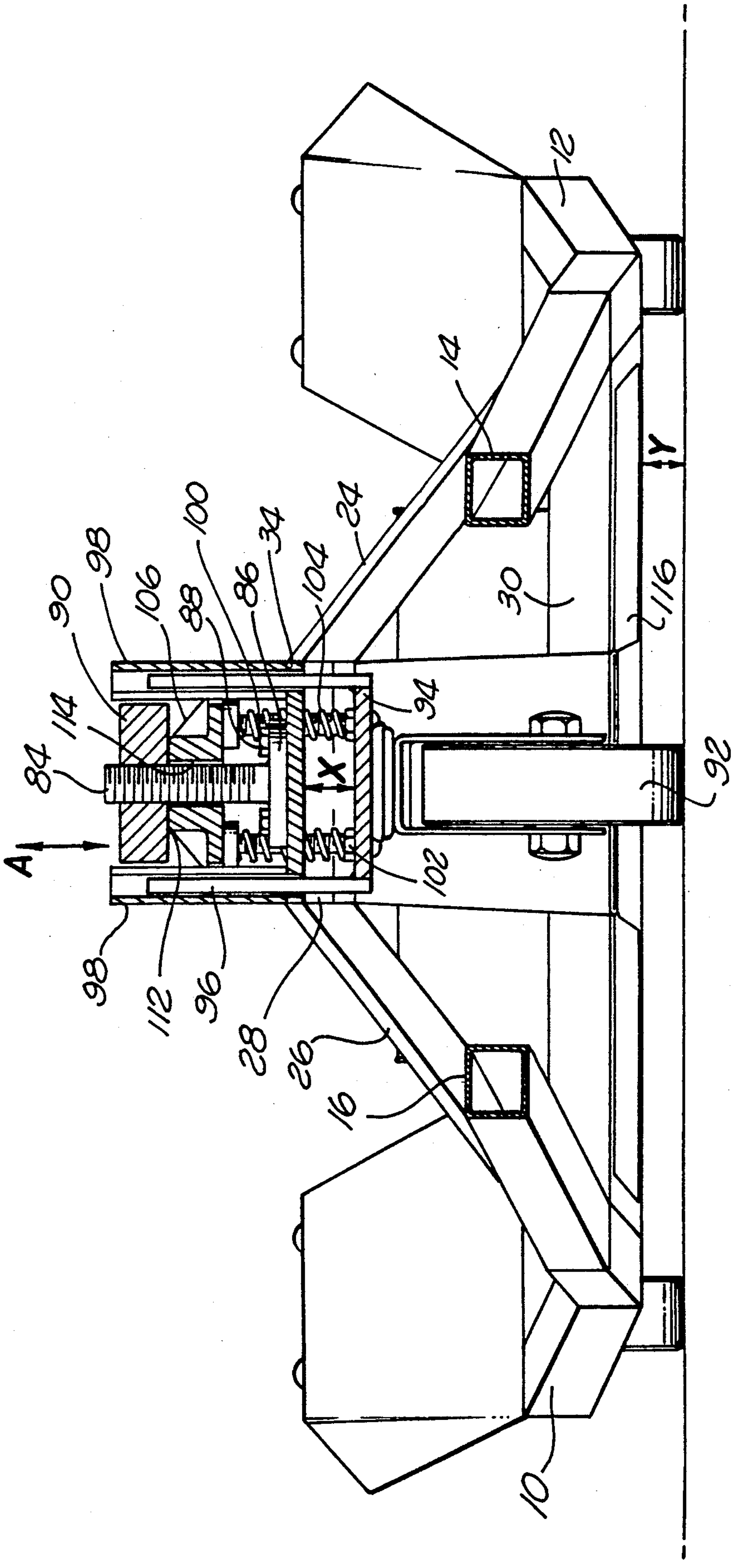
FIG. 5 is a tail end view of the preferred embodiment of the invention with the platform shown in the raised position in partial section along line 5—5 of FIG. 2.

The other part of the platform mount system, the biasing portion is now described. In FIG. 5 the castor 92 itself is shown in its normal in-use position on the floor with the platform raised as in FIG. 2. The castor 92 is attached to a lower base 94.

The lower base 94 has a pair of opposed rails 96 which are on its opposite lateral sides and extend upwardly. The rails 96 extend through the platen 34 and ride in guides 98, mounted vertically one on each side of the opposite lateral sides of the platen 34. Therefore the platen 34 ca slide easily up and down in a vertical movement controlled by the rails 96 in the guides 98.

A set of four screws 100 extend upwardly through the lower base 94, being held in place by nuts 102. Mounted on each of the screws 100 is a spring 104. The screws 100 and their respective springs 104 pass through clearance holes 101 in the platen 34.

Also mounted for clear vertical movement on the screws 100 is an upper base 106. The screws 100 pass through clearance holes 107 in the upper base 106. The springs 104 are in contact at their lower ends with the lower base 94 and at their upper ends with the upper base 106. Above the upper base 106, the screws 100 are capped by nuts 110.

The upper base 106 has an upwardly extending guide tube 112 which has a through-hole 114 through which the threaded shaft 84 passes.

An alternate embodiment is shown in FIG. 7. In this embodiment the lower base 94 has attached a pair of opposed supports 118 on which are mounted wheels 120 three on each side being illustrated. The wheels 118 will ride in the guide 98. This construction will give a smoother movement and will avoid binding.

Operation of the creeper is described with reference to FIGS. 1–6. In FIGS. 2 and 5 the biased mounting system is shown with the creeper raised, in its rolling position to a maximum upward position as permitted by the adjusted position of the adjustment knob 90 as indicated by arrow A. The platform is upwardly biased through the reactive portion by the springs 104 pushing upward, or resisting downward motion of the upper base 106, which is in turn contacted by the knob 90 and therefore through the shaft 84, the base 86 and platen 34 to the cage-like structure 2; thereby holding the platform in an off-the-floor position. Therefore, the creeper is off the floor and may be maneuvered by rolling on all three castors. In this position the operator will be lying relatively flat, with shoulders on the platform s that his/her weight is distributed between the head end and tail end sufficiently that the springs 104 will overcome the weight of the creeper and therefore will keep the upper base 106 in its upper position, the springs 104 being extended. Therefore the platen 34 and the entire creeper ar in the rolling position, that is with the creeper platform off the floor.

In the working position shown in FIG. 3 the operator has shifted weight to his/her hips such as by raising shoulders, which is a common working position or by lifting the heels slightly off the floor. That is, weight is shifted to the hips. This extra weight near the tail end is sufficient to overcome the upward biasing force of the springs 104. The entire reactive portion that is the knob 90 threaded shaft assembly 84, the upper base 106 and the platen 34, drop, compressing the springs 104 and lowering the tail end toward the floor until contact is made by the floor contact portions 10A and 12A of the platform 1. This area has friction strips 116 fitted in a pattern as shown in FIG. 4; the friction strips 116 providing a good grip on the floor to facilitate working without movement of the creeper.

The springs should be selected with a spring rate that with appropriate adjustment of the preload knob 90 and the amount of preload available based on the length of the transfer shaft 84 will accommodate a wide range of operator weight while providing a sensitivity to weight shift that makes operation convenient.

For example in the position of the adjusting knob 90 as shown if FIG. 5, the reactive assembly could drop by a distance X until the platen 34 "bottoms" on the lower base 94 or the nuts 102 (preferably the clearance holes 101 are large enough for the nuts 102 to enter). Before this occurs floor contact should occur by contact of the floor contact portions by dropping Y distance. Distance X should be slightly greater than distance Y.

In general, the preload knob 90 is an adjustment for the weight of the user. A lighter user will screw the knob "up" (counterclockwise while looking downward, for a right hand thread) thereby allowing the reactive assembly to lower and reducing distance X and Y such that less compression of the springs is required to obtain floor contact. The cap nuts 110 limit the available upward movement of the reactive assembly, and of course keep the entire biasing system together during transit.

A heavier user will screw the knob "down" thus lifting the platen 34 and the platform, so that a greater vertical distance must be traveled and consequently, more spring compression occurs before the floor contact are of the platform will strike the floor.

By the design herein described the creeper can be made as narrow as a users shoulders. It is more easily maneuverable by having the head end castors near the user's head rather than lower near the shoulders or torso as in other designs; and due to the centrally located single castor at the tail end which turns very easily and is not interfered with by the user's feet. Also, because the construction has no portion outside the smooth periphery formed by the elements 10, 16, 18, 22, 20, 14, 12, the smooth head end castor pockets 48 and 50 and element 46 this creeper can be maneuvered easily in tight spaces such as between the wheels of a dual axle semi truck. Also, the smooth periphery allows sliding contact with truck wheels to help maneuvering.

Although particular embodiments of the invention have been described and illustrated herein, it is recognized that modifications and variations may readily occur to those skilled in the art, and consequently it is intended that the claim be interpreted to cover such modifications and equivalents.

I claim:

1. A creeper comprising:

a torso supporting platform having a longitudinal axis and extending between a head end and a tail end of the creeper;

a pair of spaced apart rolling elements at the head end;

a floor contacting portion near the tail end;

a tail end rolling element located substantially on the longitudinal axis at the tail end for rolling on a floor surface;

a vertical guide portion co-acting between the tail end rolling element and the tail end for guidingly permitting vertical movement of the tail end within a selected range between a lowest position of the floor contacting portion in contact with the floor and a preselected highest position;

a resilient biasing portion co-acting between the tail end rolling element and the tail end said biasing portion applying a force urging the tail end upwardly toward the highest position until an overcoming force is applied to cause the tail end to lower to the lowest position, and resiliently urging the tail end upward when an overcoming force is not present.

2. The creeper of claim 1 wherein the biasing portion comprises:

a reactive portion attached to the platform;

a tail end mount portion attached to the tail end rolling element;

a resilient biasing means between the reactive portion and the mount portion providing a force urging the reactive portion upwardly to keep the floor contacting portion off the floor and being resilient to permit downward movement of the reactive portion until the floor contacting portion contacts the floor, the biasing means having a restoring force to lift the reactive portion when overcoming force is removed whereby the creeper may be rolled freely so long as overcoming force is not applied but will be held in place when the overcoming force is applied due to contact with the floor.

3. The creeper of claim 2 wherein the biasing means is at least one spring having a first and second end;

and the mount portion is in contact with the first end of the said at least one spring;

and the reactive portion is in contact with the second end of said at least one spring.

4. The creeper of claim 3 further comprising a vertical guide assembly having mating slidingly co-acting elements between the reactive portion and the tail end mount portion to maintain vertical alignment between them.

5. The creeper of claim 4 wherein the slidingly co-acting acting elements comprise at least one guide on the reactive portion and at least one rail on the mount portion co-acting with at least one guide.

6. The creeper of claim 5 wherein the reactive portion further comprises an adjustment system comprising;

a platen attached to the platform;

an upper member, spaced above the platen and in contact with the second end of said at least one spring said second end being an upper end;

means for connecting the platen to the upper member to cause the platen vertical position to be variable relative to the upper member;

whereby greater distance will place the floor contacting portion relatively closer tot he ground such that less compression of the spring is required to cause contact and less distance will place the floor contacting portion relatively further from the ground such that greater compression of the spring is required to cause contact.

7. The creeper of claim 6 further comprising a vertical distance adjuster comprising a vertically extending member attached at its lower end to the platen extending upwardly beyond the upper base and means cooperative with the upper base and the vertically extending member to draw the platen upwardly toward the upper base.

8. The creeper of claim 7 whereby the vertically extending member extends vertically beyond the upper base and an adjuster is attached to the vertically extending member above the upper base, in contact with it and being variable in a selected vertical location thereon and bearing on the upper base to prevent downward movement of the platen.

9. The creeper of claim 8 whereby the vertically extending member is a threaded rod and the adjuster is a threaded knob on the rod.

10. The creeper of claim 9 wherein said at least one spring is a plurality of coil springs contacting at their first lower ends the mount and at their second upper ends the upper base, urging them apart and the platen hangs downward from the upper base adjustably restrained against downward movement by the knob of the rod.

11. The creeper of claim 2 wherein the rolling elements are casters, and the head end rolling elements are in pockets whereby they extend below the platform a distance less than half their diameter further comprising and a head rest area in a space between the caster pockets.

12. The creeper of claim 11 wherein the width of the creeper at the caster pockets is not greater than the lateral dimension of the platform.

13. The creeper of claim 12 the head rest comprising a neck supporting pad and a head pad spaced longitudinally from the neck supporting pad whereby a users head can be supported at the neck by the neck supporting roll and at the head by the head roll.

14. A creeper comprising a platform extending from a head end to a tail end and extending sideways between lateral edges;

a torso supporting portion between the head end, the tail end and the lateral edges and having a floor contacting area proximate the tail end;

a head supporting portion at the head end located between the lateral edges;

a pair of head end rolling element mounts on each side of the head supporting portion and between the head supporting portion and its adjacent lateral edges and defining a pair of downwardly open pockets above the torso supporting portion;

a rolling element mounted on each of the head end pockets extending downwardly below the platform;

the tail end comprising a tail end rolling element located centrally of the longitudinal dimension of the platform;

a tail end rolling element which is guidingly movable between a first position below the platform and a second position at least slightly above the platform;

biasing means having a resistance urging the tail end downward relative to the platform toward the first position while resiliently permitting movement toward the second position when said resistance is overcome;

whereby upon placing weight on the platform the biasing means resistance may be overcome to permit the platform to lower toward the flow, until the floor contacting area contacts the floor.

15. The creeper of claim 14 further comprising a preloading apparatus for selectively increasing or decreasing said resistance.

* * * * *